United States Patent [19]

Palm et al.

[11] 4,391,791

[45] Jul. 5, 1983

[54] LOW TEMPERATURE SULFUR RECOVERY

[75] Inventors: John W. Palm; Richard Mungen, both of Tulsa, Okla.

[73] Assignee: Standard Oil Company (Indiana), Chicago, Ill.

[21] Appl. No.: 347,229

[22] Filed: Feb. 9, 1982

Related U.S. Application Data

[63] Continuation of Ser. No. 252,441, Apr. 9, 1981, abandoned.

[51] Int. Cl.$^3$ .......................... C01B 17/02; F28B 1/02
[52] U.S. Cl. .............................. 423/574 R; 23/294 S; 62/12; 55/27; 55/73; 55/80; 55/269; 423/567 R; 422/188
[58] Field of Search ....................... 423/567, 573, 574; 23/294 S; 62/12; 55/27, 73, 80, 82, 269; 262/186; 422/188

[56] References Cited

U.S. PATENT DOCUMENTS

| | | | |
|---|---|---|---|
| 1,409,338 | 3/1922 | Fenton | 23/294 S |
| 1,957,006 | 5/1934 | Wescott | 55/73 X |
| 2,708,983 | 5/1955 | McCarthy | 55/73 X |
| 3,022,635 | 2/1962 | Hagler et al. | 62/12 X |
| 4,249,921 | 2/1981 | Lett et al. | 23/294 X |

Primary Examiner—O. R. Vertiz
Assistant Examiner—Gregory A. Heller

[57] ABSTRACT

Vaporized elemental sulfur is recovered from a gaseous stream by cooling said stream in a first heat exchanger to condense elemental sulfur and then cooling said stream in a second heat exchanger to solidify the remaining elemental sulfur. The plugging of the heat exchanger is avoided by switching the operating conditions of the two exchangers and reversing the sequence of the flow through these two heat exchangers. The process and apparatus are especially useful in treating the tail gas and the intermediate streams in the Claus process or in the modified Claus process.

Instead of reversing the flow, the plugging can be avoided by using two two-zone heat exchangers. One of the heat exchangers is operated to effect the condensation of elemental sulfur in the first zone and melting the solidified sulfur deposited in the second zone. The second heat exchanger is operated to effect condensation of sulfur in the first zone and solidification of sulfur in the second zone. The operating conditions in the second zones are continually reversed before the flow through the heat exchanger is restricted by solidified sulfur.

15 Claims, 6 Drawing Figures

LOW TEMPERATURE SULFUR RECOVERY

This is a continuation of application Ser. No. 252,441, filed Apr. 9, 1981, now abandoned.

BACKGROUND OF THE INVENTION

This invention relates to processes and apparatus for recovering sulfur. In particular, it relates to removing vaporized elemental sulfur from gaseous streams, such as, from the tail gas of a Claus process.

The Claus process is widely used by the industry for the production of elemental sulfur. The process is designed to carry out the Claus reaction:

$$2H_2S + SO_2 \xrightarrow{catalyst} 2H_2O + 3S$$

The reaction is favored by decreasing the temperature and by the removal of vaporized elemental sulfur.

In the conventional Claus process, the operating conditions of the reactors in which the Claus reaction is carried out are selected to maintain elemental sulfur in the vapor state. Otherwise, the elemental sulfur would deposit on the catalyst and deactivate it. To assure high conversion rates, the reaction is carried out in two or more consecutive reactors. Elemental sulfur is condensed and removed from the effluent of the intermediate ractors before it is passed to the subsequent reactor. The removal of sulfur allows maintaining the reactors at progressively reduced temperatures. Generally, the initial reactor is operated at about 550°–650° F. (228°–343° C.); the second reactor is operated at about 450°–500° F. (232°–260° C.); and the third reactor is operated at about 400°–420° F. (204°–216° C.). About 85% of the available sulfur is recovered in the condensers upstream and downstream of the first reactor. In the condenser following the second reactor the overall sulfur recovery rate is increased to about 94% and in the condenser following the third reactor the overall sulfur recovery rate is increased to about 96%. The effluent from the third reactor still contains, therefore, about 4% of the originally present sulfur compounds. The value of additionally produced sulfur generally does not justify the use of more than two or three reactors. Accordingly, the conventional Claus process generally removes about 94–96% of the originally present sulfur.

It is highly desirable to modify the Claus process to recover a higher percentage of sulfur for two reasons. First, the presence of sulfur and sulfur compounds in the process effluent necessitates treatment so as to minimize the pollution problems. Generally, the effluent is passed to an incinerator and the resulting tail gases are then discharged through a stack. The treatment of tail gas to eliminate sulfur by processes, such as the Scot or the Beavon process, is expensive and consumes valuable energy.

Second, further recovery of sulfur in the elemental form improves the overall recovery of elemental sulfur and therefore improves the economics of the process.

One approach for increasing sulfur recovery in a Claus plant is to reduce the concentration of uncondensed sulfur in the final condenser effluent. Many plants have final condensers which were installed several years ago and operate with effluent gas temperatures as high as 300° F., which results in a concentration of about 0.2% by weight of elemental sulfur vapor in the effluent gas. The final condensers in these plants have not been converted to a more efficient design because the cost using designs heretofore available would be greater than the benefit. Some newer and larger plants have condensers with an effluent gas temperature in the range of 250°–270° F. (121°–132° C.), which reduces the concentration of elemental sulfur vapor to about 0.03–0.06% by weight. Even this lower loss rate is objectionable in these plants but heretofore it has not been feasible to cool to temperatures below about 250° F. (121° C.) because solid sulfur would form and cause plugging of equipment. An inexpensive method for overcoming this freezing point limitation has been needed.

The other approach toward increased recovery of elemental sulfur in a Claus plant is to increase the conversion of hydrogen sulfide and sulfur dioxide to sulfur. One method for increasing the conversion is to use a low temperature catalytic reactor, for example a cold bed adsorption (CBA) reactor, to treat the effluent from the final reactor of the Claus process. The reaction is generally carried out at a temperature range from about 250°–280° F. (121°–138° C.) which results in the condensation of elemental sulfur on the alumina catalyst. The low temperatures in the CBA reactor favor the reaction and the condensation of sulfur removes it from the reaction phase thereby allowing more $H_2S$ and $SO_2$ to react. The use of a CBA reactor with the Claus process can bring the overall recovery of elemental sulfur to about 99%.

There is a limitation on the low temperature at which the low temperature catalytic reactor can be operated. The gas from the final conventional Claus reactor is cooled in the sulfur condenser before entering the low temperature reactor. Heretofore it has not been feasible to cool the gas to below about 250° F. because plugging of the condenser would result. A method for cooling to lower temperature has been needed in order to increase the recovery potential of the CBA process.

There is therefore a long felt and still unsatisfied need for a process that would make it feasible to cool gas streams in the Claus process to temperatures below the point where sulfur solidifies; such a method would increase the overall recovery of sulfur to levels which were heretofore not achievable and would eliminate or reduce the amount of anti-pollution equipment used in the sulfur recovery process. The present invention achieves the above-stated goal with a process which utilizes simple, reliable and inexpensive equipment that can be manufactured from commercially available parts.

BRIEF DESCRIPTION OF THE INVENTION

The present invention significantly improves the efficiency and the economy of processes for the recovery of elemental sulfur. The process and apparatus of the present invention effect a continuous removal of elemental sulfur by solidification in addition to condensation and therefore results in the removal and the recovery of elemental sulfur which would not be removed and recovered by condensation alone.

In accordance with one aspect of the invention, the process comprises the following two modes of operation. In the first mode, a gaseous stream containing vaporized elemental sulfur is passed through a first cooling zone. The conditions of the first zone, including temperature, are maintained to effect the condensation of said vaporized elemental sulfur substantially without solidification thereof. The condensed sulfur is recovered and the gaseous stream containing vaporized elemental sulfur which did not condense at the conditions present in the first zone is passed to a second zone and therein subjected to such conditions including temperature, so as to solidify vaporized elemental sulfur present in the gaseous stream.

Before the build-up of sulfur in the second zone begins to significantly interfere with the flow of the gaseous stream therethrough, the second mode of operation is initiated. The flow direction of the gaseous stream through said first and said second cooling zones is reversed. Now the gaseous stream is first passed through the second cooling zone, then through the first cooling zone. The operating conditions, including temperature and pressure conditions of the second zone and first zone are also reversed. The conditions in the second cooling zone, including temperature, are maintained to effect condensation of said vaporized elemental sulfur substantially without solidification thereof. The conditions in the first cooling zone, including temperature, are such as to effect solidification of vaporized elemental sulfur. The temperature of the second zone causes condensation of vaporized elemental sulfur and a gradual melting of the solidified sulfur accumulated therein. The melted sulfur is recovered and the rest of the gaseous stream is passed to the first cooling zone. As the stream passes through the first zone, the vaporized elemental sulfur which was not condensed in the second cooling zone is solidified in the first cooling zone.

After at least a significant amount of solidified sulfur is melted in the second zone but before the build-up of sulfur in the first zone begins to significantly interfere with the flow of the gaseous stream the operating conditions are switched back to the first mode. The operation in the first mode is continued until at least a significant amount of solidified sulfur is melted in the first zone but before the build-up of sulfur in the second zone begins to significantly interfere with the flow of the gaseous stream therethrough. The switching between the first mode and the second mode continues for the duration of the process.

The apparatus suitable for carrying out the process of the present invention includes first heat exchange means, second heat exchange means communicating with said first means, means for selectively directing the flow of incoming gases to either said first or to said second heat exchange means and for passing it, in series, through both of said heat exchange means. It also includes means for imposing a temperature below the condensation point but above the solidication point of sulfur in the heat exchange means which the gaseous stream enters first and means for imposing a temperature below solidification point of sulfur in the heat exchange means which the gaseous stream enters after going through the first heat exchange means. The apparatus further includes means for removing condensed and melted sulfur from said first and said second heat exchange means.

Means for selectively directing the flow of incoming gases to either the first or the second heat exchange means switches the flow after at least a significant portion of the solidified sulfur is melted in the heat exchange means maintained above the melting point of sulfur but before the build-up of sulfur in the other heat exchanger means restricts the flow of the gases. Accordingly, elemental sulfur is being condensed and melted by the heat exchange means maintained above the melting point of sulfur and is being solidified by the heat exchange means maintained below the solidification point of sulfur.

In accordance with another aspect of the present invention a gaseous stream containing vaporized elemental sulfur is passed through a first cooling zone maintained at such conditions, including temperature, so as to effect condensation of elemental sulfur. The liquid sulfur is recovered and the gaseous stream is then passed through a second zone maintained at such conditions, including temperature, so as to effect melting of solidified elemental sulfur. The gaseous stream is then heated and passed to a first reactor condenser to regenerate the catalyst therein and from there to a third cooling zone maintained at such conditions, including temperature, to effect condensation of sulfur. The liquid sulfur is removed and the gaseous stream is then passed through a fourth zone maintaind at such conditions, including temperature, so as to effect solidification of elemental sulfur therein. The gaseous stream is then passed to a second reactor condenser where a catalytic reaction on the surface of the catalyst takes place and elemental sulfur is condensed on the surface of said catalyst. After a significant amount of sulfur is melted in the second zone, the temperature of the cooling means in said second zone is modified to such conditions, including temperature, to effect solidification of elemental sulfur therein. The heating of the effluent gas from said second zone is discontinued. As the effluent gas from said second zone continues to flow to said first reactor condenser, it results in cooling of said first reactor including the catalyst therein. The effluent gas from said first reactor condenser continues to flow as before to said third cooling zone to effect condensation of sulfur, to said fourth zone to effect solidification of sulfur, and to said second reactor condenser where catalytic reaction on the surface of the catalyst continues to take place. After a significant amount of cooling of said first reactor condenser has occurred but before the build-up of sulfur in the fourth zone significantly restricts the flow of gases, the flow is changed. The said gaseous stream containing vaporized elemental sulfur now flows through the third zone first, then through the fourth zone. The conditions in the first and and second and in the third zone remain unchanged. The conditions in the fourth zone are such as to effect melting of the solidified sulfur. The gaseous stream is directed from the fourth zone to the second reactor condenser at suitable condition, including temperature, to regenerate the catalyst by vaporizing adsorbed sulfur therefrom and from there to the first zone. From the first zone it is directed to the second zone which is maintained at conditions, including temperature, so as to effect solidification of elemental sulfur therein. From the second zone the gaseous stream flows to the first reactor condenser where catalytic reaction takes place on the surface of the catalyst and product sulfur is condensed on surface of said catalyst. After at least a significant amount of sulfur is melted in said fourth zone the temperature of the cooling means in said fourth zone is modified to such conditions, including temperature, to effect solidification of elemental sulfur therein. Effluent gas from said fourth zone continues to flow to said second reactor condenser but now at a temperature which results in cooling of said second reactor including the catalyst therein. The effluent from said second reactor condenser continues to flow to said first zone to effect condensation of sulfur, thence to said second zone to effect solidification of sulfur, and to said first reactor condenser where catalytic reaction on the surface of the catalyst continues to take place with condensation of produced sulfur on the surface of said catalyst. The operation is switched to the first mode after at least a significant amount of cooling of said first reactor condenser has occurred but before the build-up of sulfur in the said second zone significantly restricts the flow of gases.

DETAILED DESCRIPTION OF THE INVENTION

The present invention provides a process and apparatus for recovering, in a continuous manner, substantially all vaporized elemental sulfur present in a gas stream. In accordance with one embodiment of the process of the present invention, the incoming gas stream containing vaporized elemental sulfur is passed through two heat exchangers. The first heat exchanger effects condensation of the elemental sulfur, the subsequent one effects solidification of elemental sulfur which did not condense in the first heat exchanger. Before the build-up of elemental sulfur in the second heat exchanger significantly restricts the flow therethrough, the incoming gas stream is directed to flow first to the second heat exchanger and from there to the first heat exchanger. The operating conditions of the two heat exchangers are then interchanged so that the second heat exchanger effects condensation of the elemental sulfur and the first heat exchanger effects solidification of the vaporized sulfur that was not condensed in the second heat exchanger. The increased temperature of the second exchanger causes melting of the sulfur solidified therein. Before the build-up of solid sulfur in the first heat exchanger significantly restricts the flow therethrough, the flow of incoming stream is again switched and the operating conditions of the two heat exchangers are interchanged. This procedure is continued for the duration of the process.

In accordance with another aspect of the present invention, two two-zone heat exchangers are provided. The first zone of each of the two-zone heat exchangers is operated at such conditions, including temperature, so as to effect the condensation of elemental sulfur. The second zone of one of the heat exchangers is maintained during a first and a second period of time at conditions, including temperature, that effect solidification of elemental sulfur. The second zone of the other heat exchanger is maintained during said first time period at conditions that effect melting of solid sulfur deposited therein and during said second time period at conditions which effect solidification of elemental sulfur. The conditions of the second zone in the two heat exchangers are interchanged before the solidified sulfur significantly restricts the flow of gases through the second zone in which sulfur is being solidified. The flow of the gases is then changed so that the incoming gaseous stream flows first to the first zone of the other heat exchanger and the two time periods are repeated.

The processes of and apparatus of the present invention offer numerous advantages. First, the removal of practically all of the vaporized elemental sulfur eliminates operation and equipment costs associated with the treatment of the tail gas to remove elemental sulfur. It is estimated that the level of elemental sulfur is decreased at least to about 0.01% by weight, and in some cases the level of elemental sulfur is decreased to about 0.004% by weight, when the tail gas (containing about 0.2% sulfur by weight) from a modified Claus process is treated with the process of the present invention.

Another important advantage of the present invention is that it results in the recovery of additional elemental sulfur. The income from the sale of the sulfur recovered in accordance with the present invention can defray a large portion, if not all, of installation and operational expenses of the recovery system.

The process of the present invention for melting sulfur utilizes the heat of the incoming gas stream. Accordingly, energy savings are realized as the gas stream is cooled by heat exchange with the solidified sulfur and the sulfur is melted without the use of external heat.

A further advantage of the present invention is that it reduces the chances of plugging of lines. For example, in the modified Claus process lines leading from the final condenser to the incinerator may become plugged by sulfur deposits unless the lines are maintained at a temperature above the melting point of sulfur. The process of the present invention can remove substantially all of the elemental sulfur from the tail gas and therefore alleviates the problem of plugging the line leading to the incinerator, and also conserves energy that otherwise would be required to heat the line.

The present invention can be used for treating any gas stream that contains vaporized elemental sulfur. Presently, it is particularly useful for treating the tail gas from the Claus process. It can also be used to treat the effluent from the last reactor of the modified Claus process before said effluent is passed to the CBA (low temperature catalytic) reactor. Another example of use of the present invention is in the method for production of sulfur from hydrogen sulfide using oxygen. The process is described in U.S. Pat. No. 3,681,024 (Hujsak, et al.). The use of the present invention downstream of the reactor eliminates the need for the conventional condenser, a water scrubber, a separator vessel, a cooler and a pump and it is therefore believed to improve the economy of the Hujsak, et al. process.

The present invention will now be described in connection with the specific preferred embodiments thereof.

THE FIRST PREFERRED EMBODIMENT OF THE PRESENT INVENTION

Figure 1:
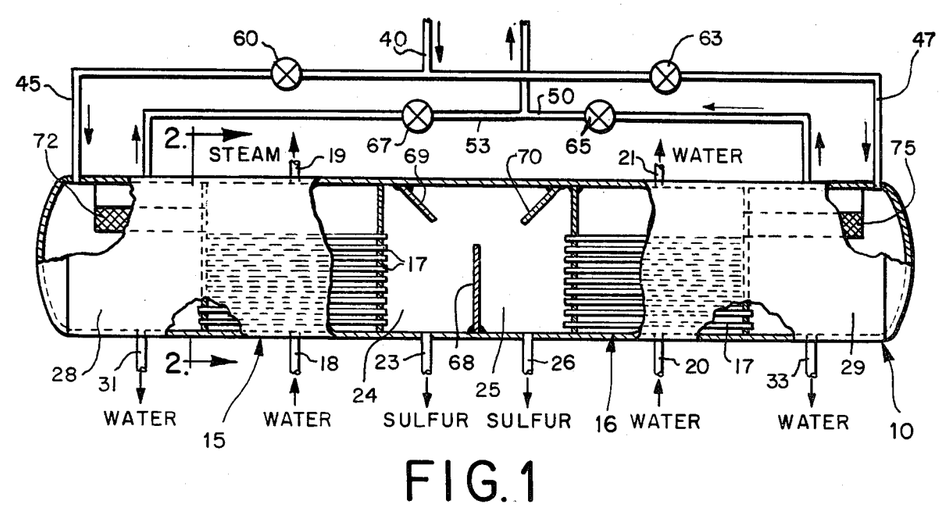
FIG. 1 is a side-elevational view of the apparatus constructed in accordance with one embodiment of the present invention.

Referring now to FIG. 1, the numeral 10 designates generally a sulfur recovery device constructed in accordance with the present invention. The device 10 includes a first heat exchange section 15 and a second heat exchange section 16.

Figures 2, 5:
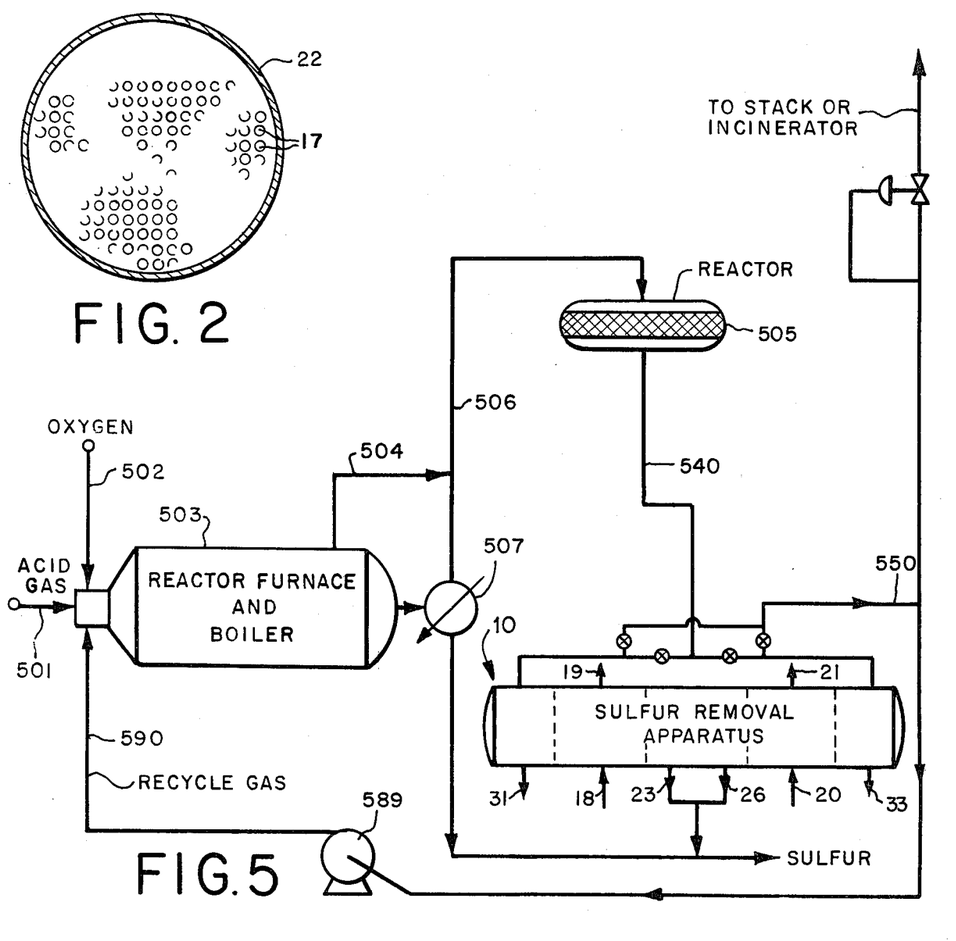
FIG. 2 is a cross-sectional view of the apparatus of FIG. 1 taken along line 2—2 thereof.
FIG. 5 is a schematic of an oxygen Claus process modified by a further embodiment of the present invention.

As shown in FIG. 2, the heat exchange sections 15 and 16 are constructed as a form of conventional shell and tubes heat exchangers. A shell 22 contains a plurality of parallel tubes 17. The cooling medium, generally water, enters the shell side of the heat exchange section 15 via an inlet 18. The cooling medium exits from the heat exchange section 15 via an outlet 19. Similarly, the cooling medium enters the shell side of the heat exchange section 16 via an inlet 20 and exits via an outlet 21. Liquid removal sections 24 and 25, located between the two heat exchange sections 15 and 16, provide a space for the accumulation of liquid sulfur. The sulfur is removed from said sections 24 and 25 via lines 23 and 26.

Sections 28 and 29 at the ends of the device 10 are provided for the collection and removal of water. The accumulated water is removed from sections 28 and 29 via lines 31 and 33, respectively.

Lines 40, 45, 47, 50 and 53 and valves 60, 63, 65 and 67 permit the flow of the gas through the device 10 in either direction and permit a reversal of the direction of the flow. Specifically, when valves 63 and 67 are closed and valves 60 and 65 are open, the gases flow through the device 10 from the left to the right. When valves 63 and 67 are open and valves 60 and 65 are closed the gases flow through the device 10 from the right to the left.

To promote the efficiency of removal of liquid and solid sulfur the device 10 is provided with baffles and filters. Specifically, sections 24 and 25 include a vertical baffle 68 and diagonal baffles 69 and 70. The baffles 68, 69 and 70 are designed to trap liquid sulfur contained in gases flowing through sections 24 and 25. Sections 28 and 29 are provided with filter mediums 72 and 75, respectively. The function of these filter mediums is to trap any solid sulfur or other particulates carried by the gaseous stream.

In operation, a gas stream containing vaporized elemental sulfur is passed through the line 40 past the valve 60 into the water removal section 28. Valves 60 and 65 are open and valves 63 and 67 are closed. Since the gas stream is generally at a temperature of about 350°–500° F. (177°–260° C.), water is not condensed in the section 28 in this mode of operation. From the section 28, gases are passed into the heat exchange section 15 which is maintained at temperatures low enough to cause the condensation of vaporized elemental sulfur but high enough to avoid solidification of elemental sulfur. Generally, the temperature of gases leaving section 15 is between about 250°–320° F. (121°–160° C.). In the preferred embodiment the gases are passed through the heat exchanger section 15 in the tube side. The cooling medium, generally water, is passed through the heat exchanger via lines 18 and 19 on the shell side. It should be understood, however, that the gases could be passed through the shell side and the cooling medium could be applied on the tube side. Also, the two heat exchange sections 15 and 16 may be side-by-side or one above the other if desired, instead of end-to-end as shown in the preferred embodiment.

The temperature of the cooling medium is controlled by varying the back pressure of the steam generated as the result of the heat exchange with gases and exiting from the heat exchange section 15 via the line 19.

The cooling of gases in section 15 causes most of the sulfur vapor to condense on the tubes 17. The flow of gases pushes the liquid sulfur toward and into the liquid removal section 24. The accumulated liquid sulfur is removed from section 24 via the line 23.

The gas stream is then passed through sections 24 and 25, past baffles 68, 69 and 70 to the heat exchanger section 16. In the preferred embodiment, the gases are passed on the tube side and the cooling medium is applied on the shell side. The temperature in the heat exchange section 16 is maintained below the solidification point of elemental sulfur. The temperature of gases leaving section 16 is generally between 180°–250° F. (82°–121° C.) and preferably between about 200°–240° F. (93°–116° C.). The required temperature is maintained in the heat exchange section 16 by passing water into the shell side thereof. The water exits at higher temperature through line 21 either in the liquid or in the vapor phase.

As the result of cooling of the gas stream, vaporized sulfur which did not condense in the section 15 is solidified on the tubes 17 of the heat exchanger section 16.

The gas stream is then passed into and through section 29 where condensed water is removed via line 33. Baffles can be provided in the section 29 to facilitate the removal of water entrained in the gas stream (not shown). The particles of solid sulfur that may be carried out in the gas stream are trapped by the filter medium 75 before the gas stream exits via the line 50. The gas stream is then passed through the open valve 65 for further treatment or directly to the atmosphere.

Before the sulfur build-up in the section 16 significantly restricts the flow of gases therethrough, the direction of the flow through the device 10 and the operation conditions of sections 15 and 16 are reversed. Valves 63 and 67 are opened and valves 60 and 65 are closed. The incoming gas stream now flows via the line 40 past the valve 63 into the line 47 into the section 29. From the section 29 the gas is passed to section 16. The heat transfer from the hot gas passing through section 16 causes melting of the sulfur that accumulated in section 16 during the first phase of the operation. Simultaneously, the vaporized elemental sulfur is condensed from the gaseous stream. The liquid sulfur is gradually pushed by the gaseous stream through the tubes 17 until it drops into the section 25. The accumulated sulfur is removed from the section 25 via the line 26.

The gaseous stream is then passed through sections 24 and 25, into the heat exchange section 15. The heat exchange section 15 is now maintained at conditions, including temperature, that effect solidification of sulfur on the tubes 17 of the heat exchange section 15. After at least a substantial portion of solid sulfur is melted in heat exchanger section 16 but before the build-up in the heat exchange section 15 substantially restricts the flow through that section, the flow through the device 10 is reversed and the operating conditions in sections 15 and 16 are interchanged. The cyclic operation is continued for the duration of the process.

It should be added that the operating conditions are preferably selected so that the switching between first and second modes and vice versa occurs after all solidified sulfur is melted in the heat exchanger which is being maintained at the higher temperature.

MODIFIED CLAUS PROCESS EMBODYING THE PRESENT INVENTION

Figure 3:
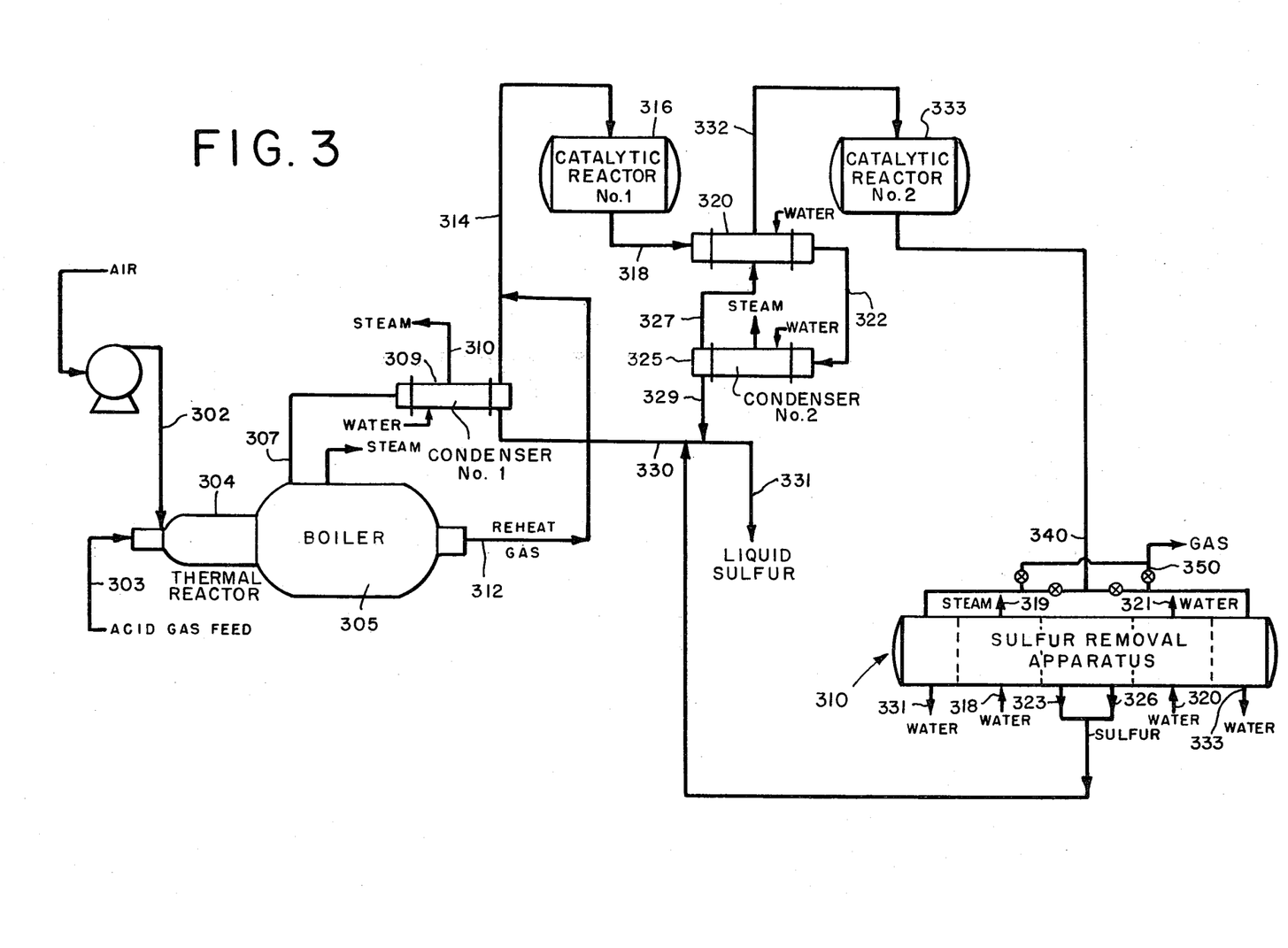
FIG. 3 is a schematic of a modified Claus process further modified in accordance with one embodiment of the present invention.

FIG. 3 depicts a modified Claus process that embodies the present invention. Briefly, air and acid gas are fed into a thermal reactor 304 via lines 302 and 303, respectively. Effluent gases from the thermal reactor 304 are cooled in boiler 305. The resulting gases are split. One portion at about 600° F. (316° C.) is passed to a first condenser 309 which condenses vaporized sulfur. The steam generated by the heat exchanger leaves via a line 310. The second portion at about 900°–1200° F. (482°–649° C.) is passed via a line 312 and combined in line 314 with gases from the first condenser 309. The gases leave the first condenser at about 400° F. (204° C.). The sulfur is removed from the condenser 309 via a line 330 and recovered. After the reheat gas 312 is combined with gases from the condenser 309 the gas stream 314 is at about 450°–500° F. (232°–260° C.). The gas stream is then passed to a catalytic reactor 316 where further conversion of $H_2S$ and $SO_2$ into elemental sulfur takes place. The elemental sulfur is recovered in heat exchanger 320 and condenser 325 via a line 329. The gaseous stream is passed via a line 332 into a second catalytic reactor 333. The effluent from the second catalytic reactor 333 is passed via a line 340 into the device 310 of the present invention such as that shown in FIGS. 1 and 2 and described above. The apparatus 310 is operated in the manner described above and produces tail gas (line 350) which contains only about 0.01 weight percent of sulfur. The designations of the apparatus 310 corresponds to the designation in FIGS. 1 and 2 but are preceded by a numeral 3.

ANOTHER EMBODIMENT OF THE MODIFIED CLAUS PROCESS EMBODYING THE PRESENT INVENTION

Figure 4:
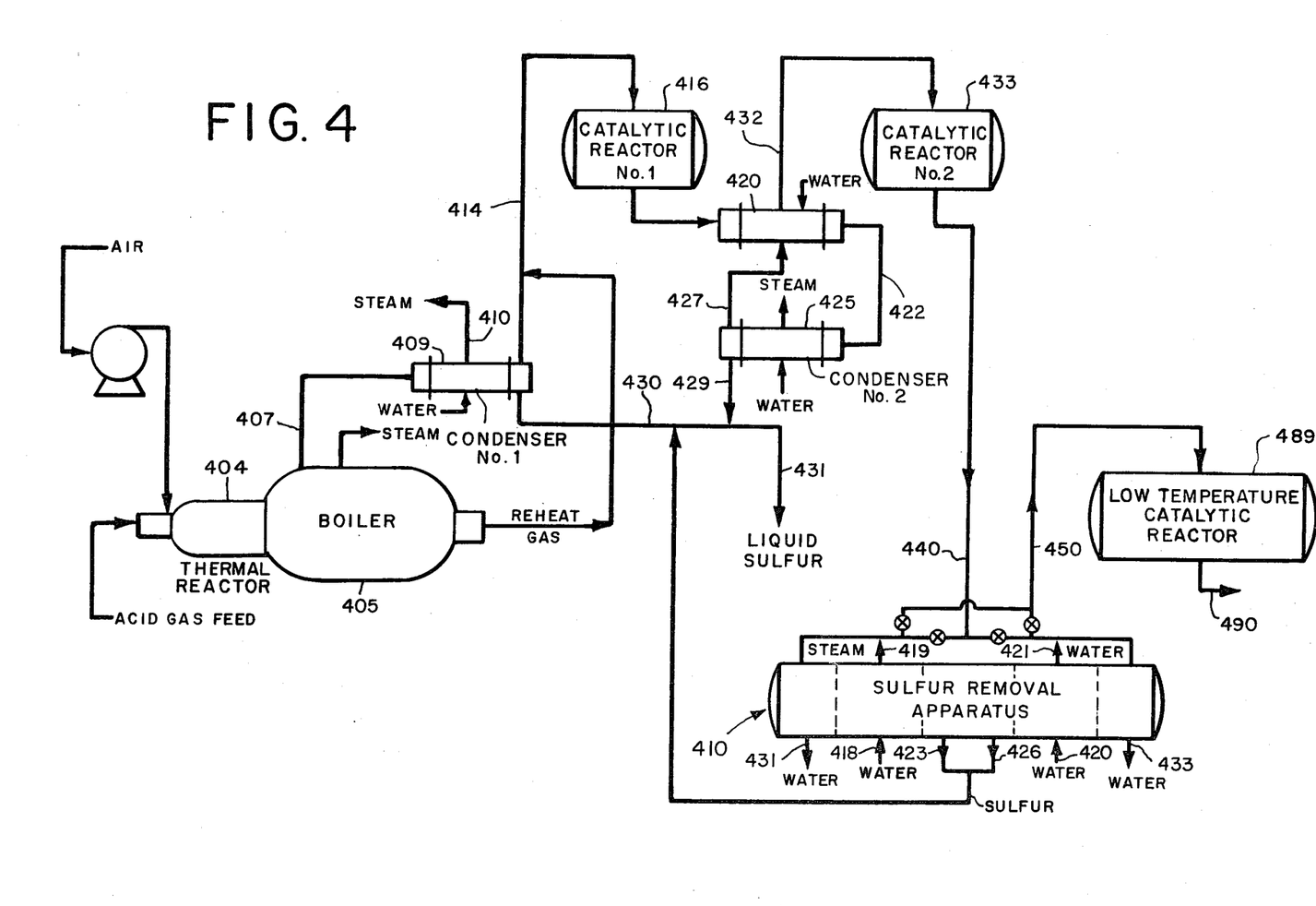
FIG. 4 is a schematic of a modified Claus process further modified by another embodiment of the present invention.

The modified Claus process embodying the present invention shown in FIG. 4 is identical to that shown in FIG. 3 and described above except that the apparatus is used for cooling the feed gas to a low temperature catalytic reactor. The numerals designating components of FIG. 4 corresponding to those shown in FIG. 3 are designated by the same last two digits but 4 instead of 3 is used as the initial digit. Additionally, the low temperature catalytic reactor is designated by a numeral 489 and the tail gas from the low temperature catalytic reactor 489 is designated by a numeral 490.

PROCESS FOR PRODUCING SULFUR FROM HYDROGEN SULFIDE AND OXYGEN EMBODYING THE PRESENT INVENTION

The process depicted in FIG. 5 is based on improvement of the process disclosed in U.S. Pat. No. 3,681,024 (Hujsak, et al.). In accordance with the FIG. 5, process oxygen, acid gas and recycled gas are introduced via lines 502, 501 and 590 into a noncatalytic reactor furnace 503. In the furnace 503, 60 to 70% of the recoverable sulfur is formed and maintained in the vapor state. A portion of the resulting gas product is passed to a condenser 507 where sulfur is recovered by condensation. Another portion is passed via a line 504 and combined in a line 506 with the gaseous effluent from the condenser 507. The resulting gaseous stream is then passed to a catalytic reactor 505. The effluent from the catalytic reactor 505 is passed via a line 540 to the apparatus for the removal and recovery of sulfur that is constructed in accordance with the present invention. The apparatus depicted in FIG. 5 is the same as shown in FIGS. 1 and 2 and described above.

The operating conditions of the process depicted in FIG. 5 up to the reactor 505 are those described in the Hujsak et al. patent. The operating conditions of said apparatus are as described above in connection with the embodiment depicted in FIGS. 1 and 2.

ANOTHER EMBODIMENT OF THE PRESENT INVENTION

Figure 6:
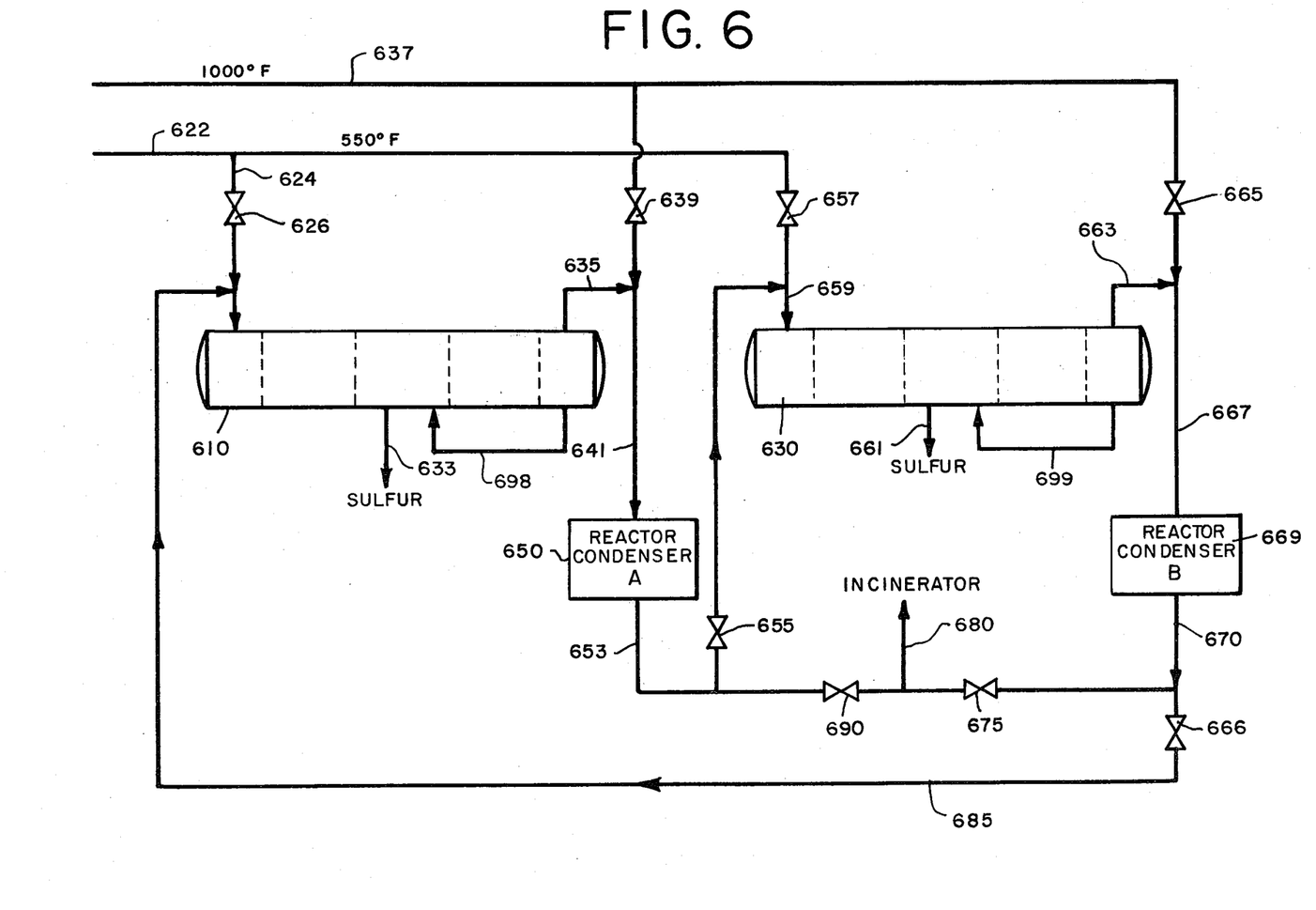
FIG. 6 is a schematic of still another embodiment of the present invention.

FIG. 6 depicts a process for the removal and recovery of elemental sulfur that utilizes two devices 610 and 630 that are identical to the device 10 depicted in FIGS. 1 and 2 except that sulfur is collected not only in the mid-sections but also in the end section and passed to the mid-section via lines 698 in the unit 610 and 699 in the unit 630.

The piping and the operation of this process differ, however, from the process described above in connection with the apparatus depicted in FIGS. 1 and 2. The process is best applied to the last in a series of reactors in the Claus process. The process of this embodiment comprises four distinct phases. In phase "A" the reactor condenser 650 is regenerated while liquid sulfur is being collected in the front sections of devices 610 and 630 and while solid sulfur is being collected in the second heat exchange section of the device 630. A gaseous stream 622 is passed via a line 624 and a valve 626 into the device 610. Both heat exchange sections of the device 610 are maintained to effect condensation of elemental sulfur but above the solidification temperature of sulfur. Accordingly, the device 610 removes condensed sulfur and the sulfur solidified in the tubes of the second heat exchanger is melted down. The gaseous stream exiting from the device 610 via the line 635 is combined in line 641 with the hot (1000° F.; 538° C.) gaseous stream 637 passed through a valve 639. The combined stream is passed to a reactor condenser 650 causing regeneration of the catalyst present therein. From the reactor condenser 650, the gases are passed via a line 653 and a valve 655 to the device 630. The first heat exchange section of the device 630 is maintained at conditions effecting condensation of elemental sulfur. The second heat exchange section of the device 630 is maintained at conditions that effect solidification of elemental sulfur. The gaseous stream is then passed via a line 663 and line 667 to a reactor condenser 669 where further reaction takes place. The gaseous effluent from the reactor condenser 669 is passed via a valve 675 on line 680 to an incinerator. Valves 657, 665, 666 and 690 are all closed during phase "A".

In phase "B", the reactor condenser 650 is cooled. The flow path and operation are the same as in phase "A" except that the flow of hot gas through valve 639 is discontinued and the temperature of the second condenser of the device 610 is reduced so as to effect solidification of sulfur therein.

In phase "C", the reactor condenser 669 is regenerated while solid sulfur is formed in the second heat exchanger of the device 610 and melted in the second heat exchanger of the device 630. The gas from the line 622 passes via valve 657 and a line 659 into the device 630. The conditions in the first heat exchanger of the device 630 are maintained to condense sulfur and in the second heat exchanger to melt sulfur solidified therein. The effluent from the device 630 is passed via line 663 and combined in the line 667 with the hot gas passing through the valve 665. The hot gas is used to regenerate reactor condenser 669. The effluent from the reactor condenser 669 is passed via the line 670, the valve 666 and the line 685 to the device 610. The first heat exchanger of the device 610 is maintained at a temperature to effect condensation, the second to effect solidification of sulfur. The effluent from the device 610 is passed via the line 641 to the reactor condenser 650, and thence via line 653, valve 690 and line 680 to an incinerator (not shown).

In phase "D", the flow path and the operation are the same as those in phase "C" except that the flow of gas through the valve 665 is discontinued and the temperature of the second condenser of the device 630 is reduced to effect solidification of sulfur therein. After phase "D" the cycle is started again with phase "A".

The removal by devices 610 and 630 of sulfur from the gaseous stream entering the reactor condenser 669 during phases "A" and "B" permits the operation of the reactor condenser 669 at a significantly lower temperature than in a conventional process. Thereby the efficiency of the reaction is improved. Similarly, the removal by devices 610 and 630 of sulfur from gaseous streams entering the reactor condenser 650 during phases "C" and "D" permits lower operating temperature and therefor better efficiency in the reactor condenser 650.

Many changes and modifications will occur to those skilled in the art upon studying this disclosure. All such changes and modifications that fall within the spirit of this invention are intended to be included within its scope as defined by the appended claims.

We claim:

1. A process for removing and recovering vaporized elemental sulfur from a gas stream, said process comprising:
    (a) passing said gas stream through a first cooling zone maintained at such conditions, including temperature, so as to effect condensation of elemental sulfur without solidification thereof;
    (b) passing said gas stream from said first cooling zone through a second cooling zone maintained at such conditions, including temperature, so as to effect solidification of elemental sulfur therein;
    (c) interchanging conditions of said first cooling zone and said second cooling zone and directing said gas stream to flow through said second cooling zone first and then through said first cooling zone;
    (d) interchanging conditions of said first cooling zone and said second cooling zone and directing said gas stream to flow through said first cooling zone first then through said second cooling zone, said steps (c) and (d) being carried out after at least a significant part of the build-up of elemental sulfur is melted in the zone maintained at condensation conditions but before the build-up in the zone maintained at solidification conditions significantly restricts the flow of said stream.

2. The process of claim 1 wherein said gas stream is the tail gas of the Claus process.

3. The process of claim 1 wherein the temperature of said gas stream as it exits the zone maintained at conditions for effecting condensation is between 250° and 320° F.; and wherein the temperature of said gas stream as it exits the zone maintained at conditions for effecting solidification is between about 180° and 250° F.

4. The process of claim 3 wherein the temperature of said gas stream as it exits the zone maintained at conditions for effecting solidification is between about 200° and 240° F.

5. The process of claim 1 wherein said first zone comprises a tube side of a shell-tube heat exchanger and wherein the temperature in said first zone is maintained by passing water through the shell side of said heat exchanger.

6. An apparatus for removing and recovering vaporized elemental sulfur from a gas stream, said apparatus comprising:
    first heat exchange means;
    second heat exchange means communicating with said first heat exchange means;
    means for directing said gas stream through said first heat exchange means and said second heat exchange means in one of two modes, in the first mode said gas stream being directed to said first heat exchange means first and then to said second heat exchange means, in the second mode said gas stream being directed to said second heat exchange means first and then to said first heat exchange means;
    means for cooling said gas stream passing through said first heat exchange means in the first mode, and said second heat exchange means in the second mode to a temperature that effects condensation of vaporized elemental sulfur and for cooling said gas stream passing through said second heat exchange means in the first mode and said first heat exchange means in the second mode to a temperature that effects solidification of vaporized elemental sulfur, said directing means being switched from the first to the second mode and vice versa before the build-up of solidified sulfur in the heat exchanger maintained to effect solidification significantly interferes with the flow of the gas stream therethrough; and
    means for recovering liquid sulfur from said first and said second heat exchange means.

7. The apparatus of claim 6 wherein
    said first heat exchange means comprises the tube side of a shell-tube heat exchanger;
    said second heat exchange means comprises the tube side of a shell-tube heat exchanger;
    said cooling means comprises the shell side of said heat exchanger;
    said means for directing said gas stream comprises a first line communicating with a second line and with a third line, a fourth line communicating with said third line and a fifth line communicating with said fourth line and said second line, said second line communicating with said first heat exchange means, said third line communicating with said second heat exchange means, a first valve for closing the communication between said first line and said second line but not the communication between said second line and said fifth line, a second valve for closing the communication between said first line and said third line, a third valve for closing the communication between said second line and said fifth line and a fourth valve for closing the communication between said third line and said fourth line, such that when said first and said fourth valves are open and said second and third valves are closed said gas stream flows first to said first heat exchange means and then through said second heat exchange means and when said second and third valves are open and said first and fourth valves are closed said gas stream flows first to said second heat exchange means and then through said first heat exchange means.

8. The apparatus of claim 7 further comprising means for accumulating liquid sulfur from said first and said second heat exchange means before said liquid sulfur is recovered.

9. In the modified Claus process for producing elemental sulfur of the type including the steps of reacting hydrogen sulfide and sulfur dioxide in a thermal reaction zone, passing the resulting gaseous stream through a first condensing zone to recover elemental sulfur therefrom and then passing through a plurality of high-temperature catalytic reactor zones arranged in series and operating at progressively lower temperatures, each of said high-temperature catalytic reactor zones being followed by a corresponding condensing zone for condensing and removing elemental sulfur from said gaseous stream, then passing said gaseous stream into a low-temperature catalytic reactor zone, the sulfur produced therein being condensed onto the catalyst present in said low-temperature catalytic reactor zone, the improvement comprising:

(a) passing a gas stream exiting from said final high-temperature catalytic reactor through a first cooling zone maintained at such conditions, including temperature, so as to effect condensation of elemental sulfur without solidification thereof;

(b) passing said gas stream from said first cooling zone through a second zone maintained at such conditions, including temperature, so as to effect solidification of elemental sulfur therein;

(c) interchanging conditions of said first cooling zone and said second cooling zone and directing said gas stream to flow through said second cooling zone first and then through said first cooling zone;

(d) interchanging conditions of said first cooling zone and said cooling second zone and directing said gas stream to flow through said first zone first then through said second zone, said steps (c) and (d) being carried out after at least a significant part of the build-up of elemental sulfur is melted in the zone maintained at condensation conditions but before the build-up in the zone maintained at solidification conditions significantly restricts the flow of said stream;

(e) recovering liquid sulfur from said first and said second zone; and (f) passing effluent from said second zone in step (b), from said first zone in step (c), and from said second zone in step (d) to said low-temperature catalytic reaction zone.

10. A process for production of sulfur from hydrogen sulfide and oxygen comprising:

(a) reacting some of said hydrogen sulfide with oxygen to produce sulfur dioxide in a first reaction zone;

(b) reacting sulfur dioxide produced in step (a) with the remaining hydrogen sulfide to produce a mixture of vaporized elemental sulfur, water, volatile sulfur compounds and unreacted hydrogen sulfide and sulfur dioxide;

(c) cooling said mixture to separate it into liquid sulfur and gaseous effluent;

(d) reacting said gaseous effluent in the presence of a catalyst to produce a mixture of vaporized elemental sulfur, water, volatile sulfur compounds, and unreacted hydrogen sulfide and sulfur dioxide;

(e) passing said mixture through a first cooling zone maintained at such conditions, including temperature and pressure, so as to effect condensation of elemental sulfur without solidification thereof;

(f) passing said mixture from said first cooling zone through a second cooling zone maintained at such conditions, including temperature and pressure, so as to effect solidification of elemental sulfur therein;

(g) interchanging conditions of said first cooling zone and said second cooling zone and directing said mixture to flow through said second cooling zone first and then through said first cooling zone;

(h) interchanging conditions of said first zone and said second zone and directing said mixture to flow through said first zone first then through said second zone, said steps (g) and (h) being carried out after at least a significant part of the build-up of elemental sulfur is melted in the zone maintained at condensation conditions but before the build-up in the zone maintained at solidification conditions significantly restricts the flow of said stream;

(i) recovering liquid sulfur from said first and said second zones.

11. The process of claim 10 further comprising:

(a) removing water from said second cooling zone during step (f);

(b) removing water from said first cooling zone during step (g); and (c) removing water from said second cooling zone during step (h).

12. The process of claim 10 further comprising:
recycling gaseous streams from said second cooling zone in steps (g) and (h) to said first reaction zone.

13. A process for removing and recovering sulfur from hot and cold gas streams containing hydrogen sulfide, sulfur dioxide and vaporized elemental sulfur, said hot gas stream being at a temperature sufficient to regenerate catalyst in a low-temperature catalytic reactor, said process comprising:

(a) passing said cold gas stream through a first zone maintained at such conditions, including temperature, so as to effect condensation of elemental sulfur without solidification thereof;

(b) passing said gas stream from said first zone through a second zone maintained at such conditions, including temperature, so as to effect melting of elemental sulfur therein;

(c) combining said gas stream from said second zone with said hot gas stream and passing said mixture to a first reactor condenser to vaporize condensed sulfur and regenerate a catalyst therein;

(d) passing said gas stream from said first reactor condenser to a third zone maintained at such conditions, including temperature, so as to effect condensation of elemental sulfur without solidification thereof;

(e) passing said gas stream from said third zone to a fourth zone maintained at conditions, including temperature, that effect solidification of sulfur;

(f) passing said gas stream from said fourth zone into a second reactor condenser and therein reacting hydrogen sulfide with sulfur dioxide on the surface of a catalyst to produce condensed sulfur which is condensed thereon;

(g) subsequently directing the flow of the cold gas to the third zone and the flow of hot gas to the second reactor condenser;

(h) reversing the conditions in the second and the fourth zones such that sulfur is solidified in the second zone and melted in the fourth zone, the reaction proceeding on the catalyst of the first reactor and the second reactor being regenerated;

(i) recovering sulfur from said first, second, third, and fourth zones.

14. The process of claim 13 wherein the gas stream is contacted in said second and in said fourth heat exchange zone with catalyst particles allowing the conversion of hydrogen sulfide and sulfur dioxide to elemental sulfur.

15. A process for removing and recovering elemental sulfur from hot and cold gaseous streams containing hydrogen sulfide, sulfur dioxide and vaporized elemental sulfur, said process comprising:
  (a) passing said stream through a first zone maintained at such conditions, including temperature, so as to effect condensation of elemental sulfur without solidification thereof; then
  (b) passing said gas stream from said first zone through a second zone maintained at such conditions, including temperature, so as to effect melting of any elemental sulfur deposited therein;
  (c) passing said stream through a heating zone to impart thereto a sufficiently high temperature to vaporize condensed sulfur and regenerate a catalyst; then
  (d) passing said stream to a first reactor condenser containing a catalyst to vaporize condensed sulfur and to regenerate the catalyst;
  (e) passing said stream from said first reactor condenser to a third zone maintained at such conditions, including temperature, so as to effect condensation of elemental sulfur without solidification thereof;
  (f) passing said stream from said third zone to a fourth zone maintained at conditions, including temperature, that effect solidification of sulfur;
  (g) passing said stream from said fourth zone into a second reactor condenser and therein reacting hydrogen sulfide with sulfur dioxide on the surface of a catalyst to produce condensed sulfur thereon; then
  (h) before the accumulation of sulfur significantly restricts the flow of said stream through said fourth zone but after the catalyst is regenerated in said first reactor, reversing the conditions in the second and the fourth zones such that sulfur is solidified in the second zone and melted in the fourth zone, directing the flow of the stream of step (a) to the third zone rather than to said first zone and from there to said fourth zone, then passing said stream through said heating zone and therefrom to said second reactor condenser to vaporize condensed sulfur and to regenerate the catalyst, the reaction proceeding in the first reactor and the second reactor being regenerated;
  (i) repeating steps (a) through (g) before the accumulation of sulfur significantly restricts the flow of said stream through said second zone but after the catalyst is regenerated in said second reactor;
  (j) recovering sulfur from said first, second, third, and fourth zones.